March 15, 1927. 1,620,778
E. R. ODOM
CARRYING-IN DEVICE FOR LEERS
Original Filed June 4, 1923 6 Sheets-Sheet 1
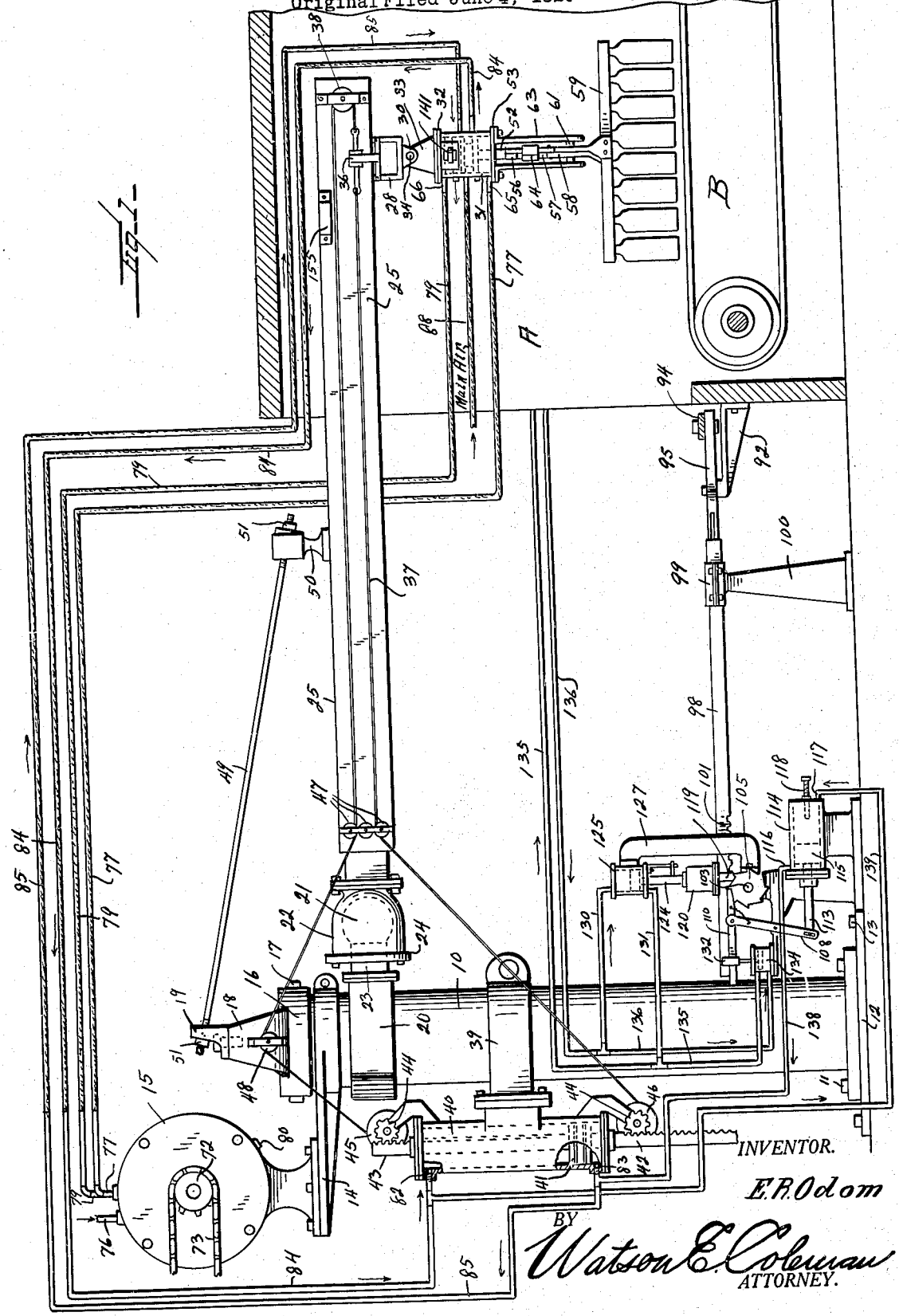

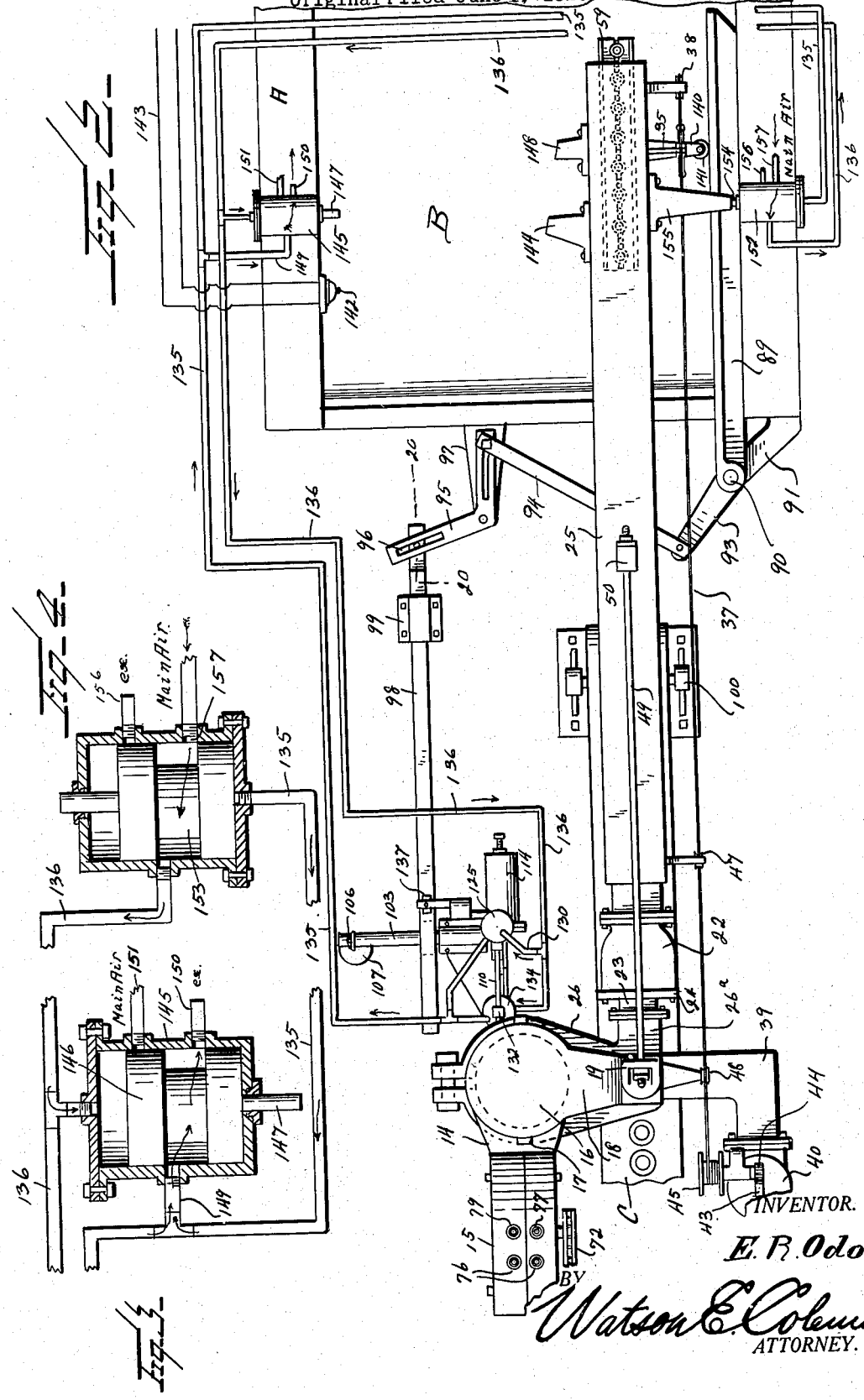

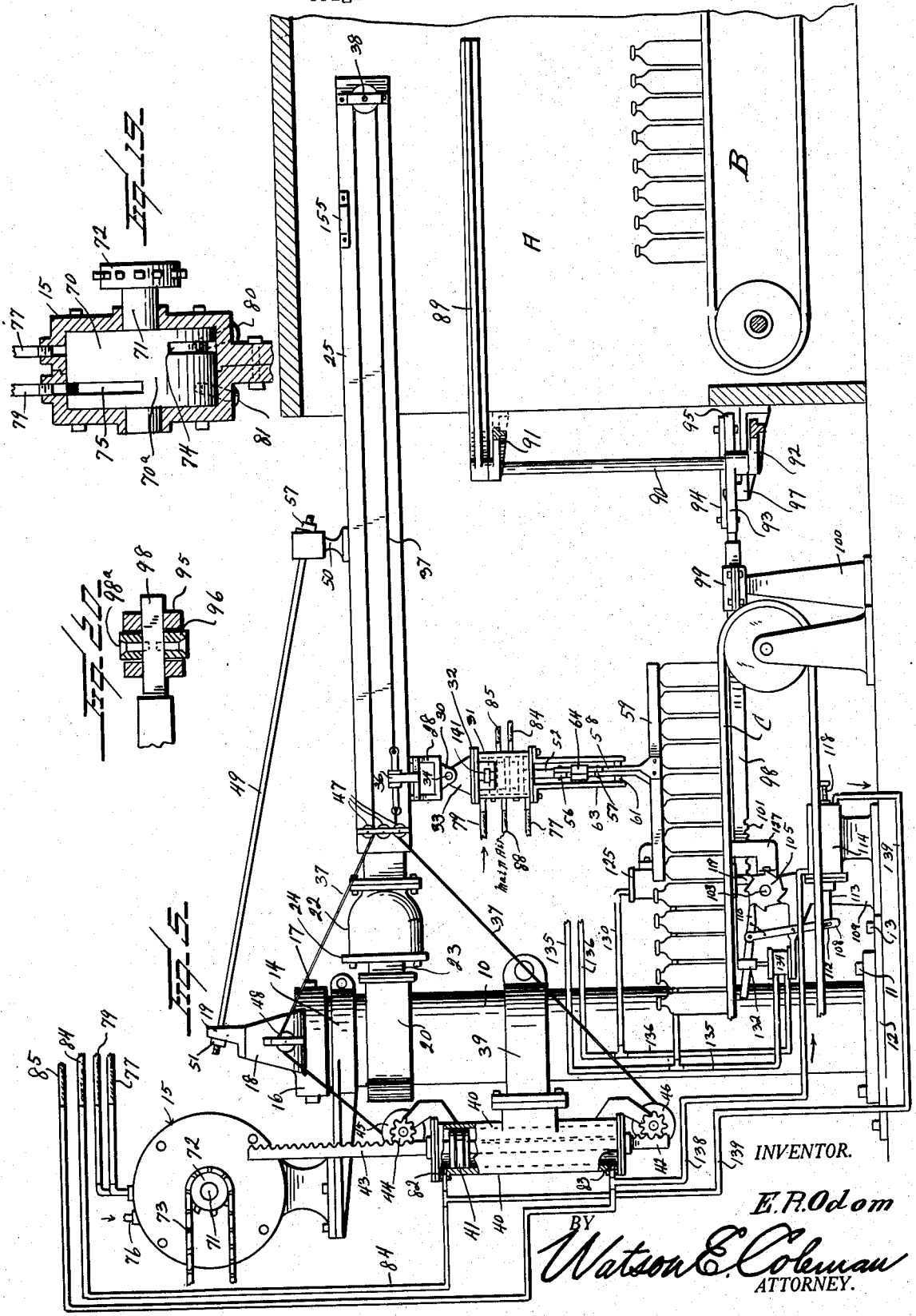

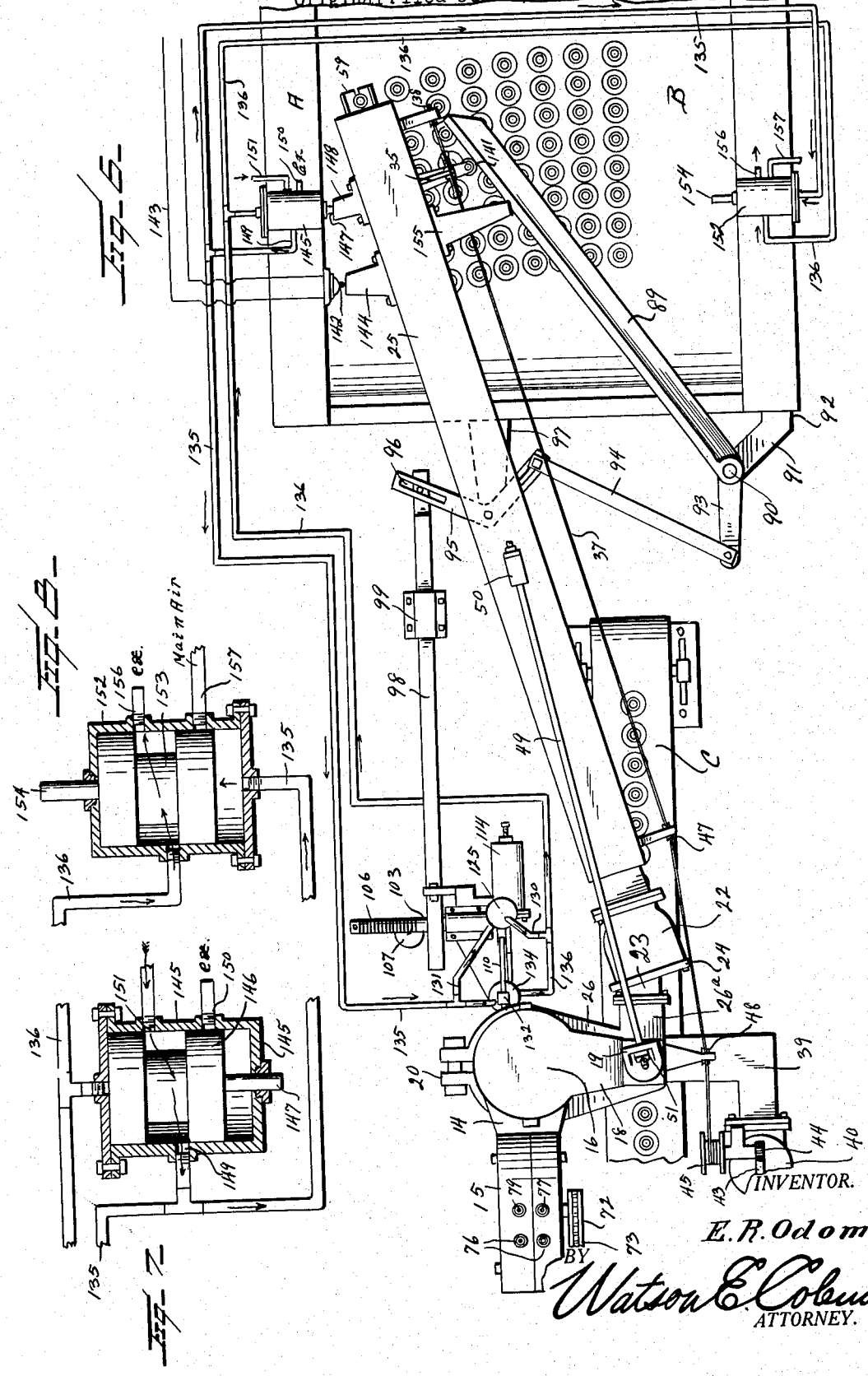

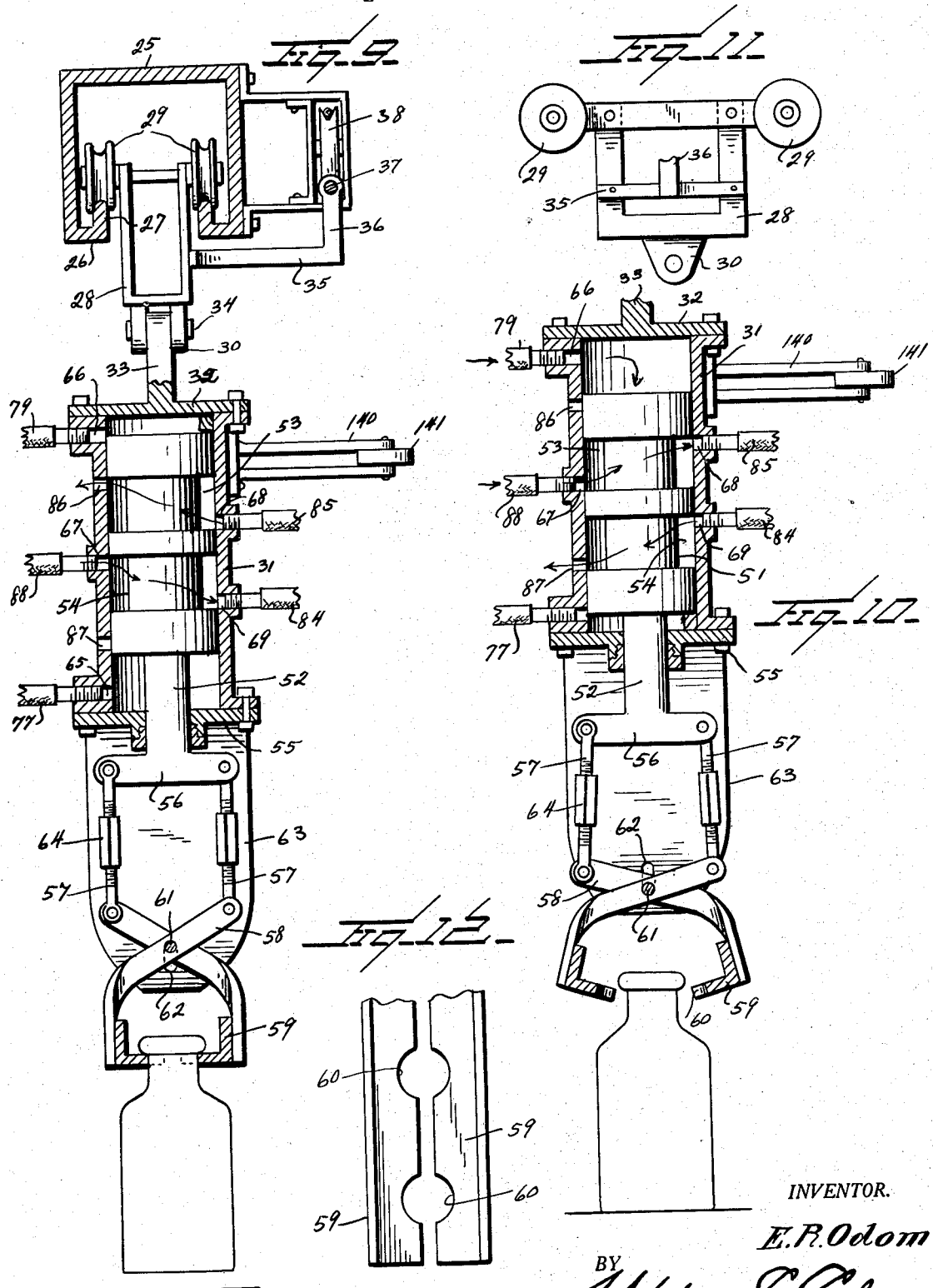

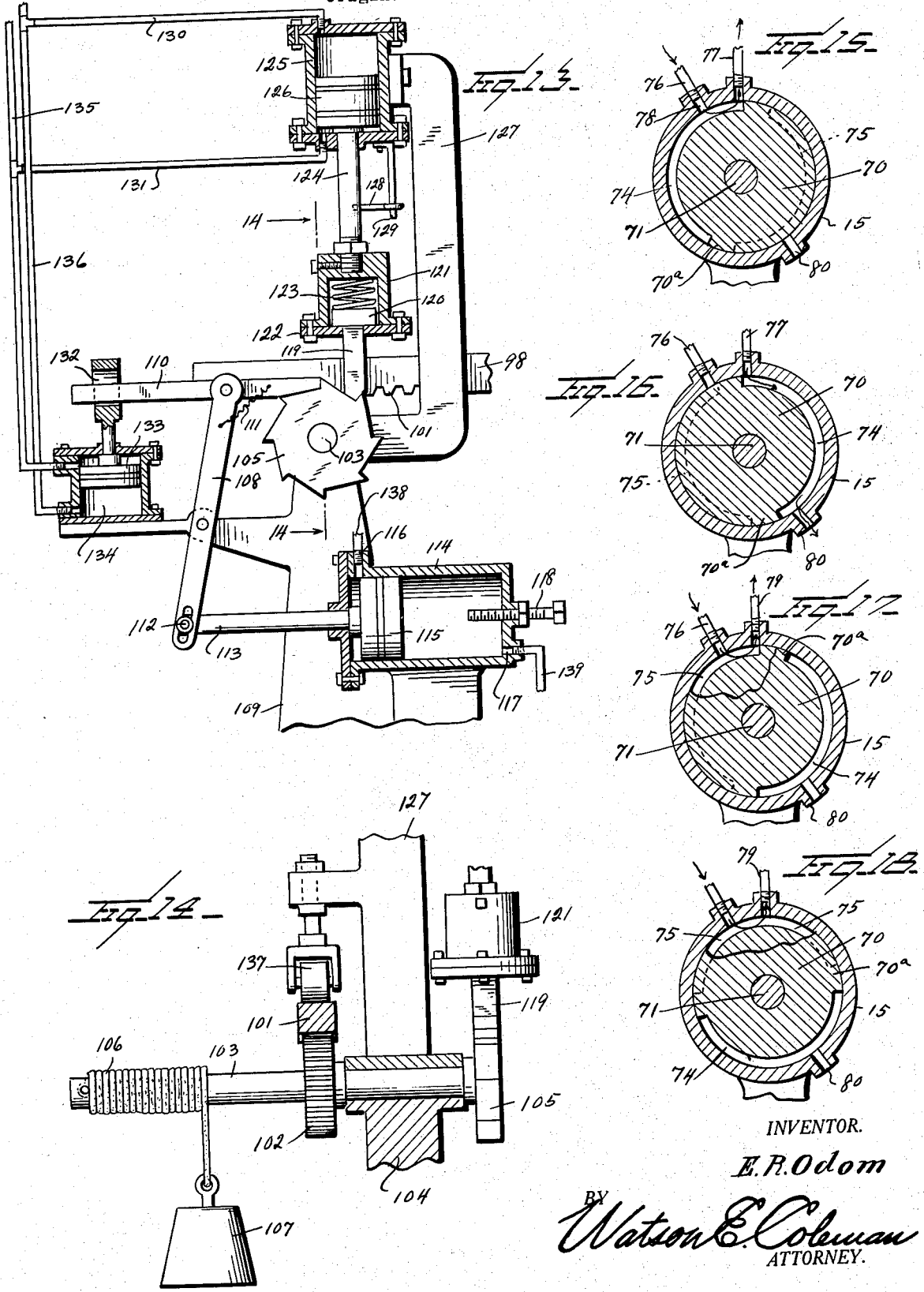

Patented Mar. 15, 1927.

1,620,778

UNITED STATES PATENT OFFICE.

EARL R. ODOM, OF ST. LOUIS, MISSOURI.

CARRYING-IN DEVICE FOR LEERS.

Application filed June 4, 1923, Serial No. 643,320. Renewed September 28, 1926.

This invention relates to the art of glass making, and particularly to means for "carrying-in," that is means for carrying glass articles into the leer or annealing oven.

In the art of annealing glassware, a leer or annealing oven is used which is, under ordinary circumstances, somewhat over five feet in width and approximately sixty-five feet long, and the glassware is carried through this annealing oven and submitted to the annealing temperature by means of an endless conveyor. Boys are employed to carry the bottles or other glassware from a "buck" or other conveyor to the leer and place the glassware therein on the conveyor. When a certain amount of glassware has been disposed upon the conveyor a signal is given, the conveyor is connected to a source of power which moves it slowly inward a determinate distance, and then the operators at the opposite end of the conveyor remove the batch of glassware therefrom which has been annealed. Such a manual transportation of the glassware from the buck to the conveyor of the leer results in a very large percentage of breakage, as the bottles or other ware are rather roughly handled and oftentimes tip over when they are placed upon the leer conveyor.

The main object of this invention is to provide mechanical means whereby the bottles may be shifted automatically from the buck or other bottle support into the leer and the bottles or other ware discharged in a standing position upon the conveyor of the leer and this operation continued until a certain batch or number of bottles has accumulated upon the leer conveyor, means being provided for then giving a signal to the operators at the discharge end of the conveyor who, if they have removed one batch of ware from the conveyor, will energize the motor of the conveyor, causing the conveyor to move forward one step so as to carry the ware placed on the conveyor fully into the leer and leave a space for another batch of ware to be placed upon the entrance end of the conveyor.

A further object is to provide means for disposing the bottles within the leer in rows upon the conveyor, and provide means whereby the bottle carrying device shall be automatically shifted from an initial position laterally so as to dispose the bottles successively in lateral rows upon the face of the conveyor until the width of the conveyor has been approximately filled, means being then provided for shifting the bottle depositing device or carrying-in device again to its initial position.

A still further object is to provide a device of this character wherein the bottles on the buck conveyor are gripped, then lifted, carried into the leer and lowered upon the conveyor therein, the bottle engaging device then moving outward back to a position over the buck without lifting and being shifted into position to grip the necks of the bottles without being lowered upon the bottles on the buck.

Another object is to provide a mechanism of this kind which is actuated by compressed air and which does not need any workmen to assist in the operation except, of course, the ordinary care of the machinery.

Other objects have to do with the details of construction and arrangement of parts as will appear more fully hereinafter.

My invention is illustrated in the accompanying drawings, wherein:—

Figure 1 is a side elevation of my improved carrying-in mechanism. the cylinder 40 being partly broken away, the view also showing in section the entrance end of a leer of conventional form;

Figure 2 is a top plan view of the construction illustrated in Figure 1, showing the carrying-in beam at its initial position;

Figure 3 is a sectional view of one of the automatic valves controlling the carrying-in mechanism;

Figure 4 is a sectional view of another of the automatic valves, the positions of the valves in Figures 3 and 4 being that which they would occupy when the parts are in the position shown in Figure 2;

Figure 5 is a like view to Figure 1, but showing the carrier retracted;

Figure 6 is a like view to Figure 2, but showing the carrying-in beam and its guide bar at the end of their lateral movements;

Figure 7 is a like view to Figure 3 but showing the valve therein in the position which it would occupy with the apparatus in the position shown in Figure 6;

Figure 8 is a like view to Figure 4, but showing the valve in position which it would occupy when the parts were in the position shown in Figure 6;

Figure 9 is a sectional view of the carrying-in beam and of the cylinder which actuates the gripping jaws, the jaws being shown in section and the parts being shown in the position which they occupy when the jaws are closed;

Figure 10 is a fragmentary section on the same plane as Figure 9, but showing the position of the parts when the jaws are opened to deposit the ware;

Figure 11 is a fragmentary side elevation of the carrier;

Fig. 12 is a fragmentary plan view of the jaws;

Figure 13 is a side elevation of the mechanism for controlling the movement of the guiding bar or spacing bar 89, the controlling cylinders for the mechanism being in section;

Figure 14 is a fragmentary rear elevation of the construction shown in Figure 13, the supporting bracket being in section;

Figures 15, 16, 17 and 18 are sectional views of the timing valve and its casing, showing the valve in the various positions which it successively occupies;

Figure 19 is a vertical sectional view through the timer casing, showing the valve 70 in elevation;

Figure 20 is a fragmentary section on the line 20—20 of Figure 2.

Referring particularly to Figures 1, 2, 5 and 6, it will be seen that the leer A is of the usual construction, and that disposed within the leer and operating lengthwise thereof is an endless conveyor B. The leer and the endless conveyor B I have shown conventionally but it will be understood that my mechanism is adapted to any desired type of leer and any desired type of conveyor. The bottles or other ware are transported to a position near the leer by any suitable means as, for instance, the endless conveyor C, which is also conventionally shown. I have illustrated the ware as being in the form of bottles, but it will be understood that the carrying-in device may be adapted for carrying in articles of an entirely different character.

My apparatus includes a column 10 whose base is bolted to the floor by bolts 11 or in any other suitable manner, this column being preferably mounted for slight adjustment longitudinally, the bolts 11 engaging a base plate 12, in turn held to the floor by means of bolts or other suitable means 13. The slots in the base of the column permit of longitudinal adjustment of the column toward or from the leer. The upper end of the column carries upon it a bracket 14 supporting a timer 15 whose detailed construction will be later described. This column is preferably tubular and is closed at its upper end by a cap 16 held in place by screws 17 and this cap has mounted upon it a supporting member 18 upon which is swiveled a terminal member 19. Mounted upon the column just below the bracket 14 is a clamp 20 which supports at its outer end a ball 21 with which a socket 22 has operative swinging engagement, the socket being held in place upon the neck 23 of the ball by means of a clamp 24 which loosely surrounds the neck and which is bolted to the body of the socket.

Bolted or otherwise attached to the socket 22 is the beam 25 which, as illustrated in Figure 9, is hollow and formed with the inturned flanges 26 having upwardly extended flanges 27. Operating upon these brackets is a carrier 28 having grooved wheels 29 which engage the bracket, there being four of these wheels to each carrier, as shown clearly in Figures 9 and 11. The lower end of this carrier is formed with a pair of ears 30 and swingingly engaged with these ears is a cylinder 31. The cylinder at its upper end is closed by a cylinder head 32 having an upwardly projecting ear 33 which fits between the ears 30 and is pivoted thereto by the pivot pin 34. Thus the cylinder 31 may swing forward and backward. The carrier 28 has a laterally extending arm 35 whose extremity extends upward, as at 36, and is connected to a cable 37. This cable 37, which is re-torsed so as to provide a bight portion and two approximately parallel portions, passes around a pulley or sheave 38 mounted upon the extremity of the beam 25, as seen in Figure 1. A clamp 39 embraces the column 10 below the clamp 20, and carried by this clamp 39 is a cylinder 40 within which operates the piston 41. This piston carries the oppositely projecting rack bars 42 and 43 which respectively engage with gear wheels 44 mounted upon shafts which carry winding drums 45 and 46.

The bight of the cable 37 passes around the pulley 38 and the two stretches of the cable pass between the pulleys 47 mounted upon the rear end of the beam, one stretch of the cable extending upward and over a pulley 48 mounted upon the cap 16 and then down and around the drum 45, while the other stretch of the cable passes downward to the drum 46. It will thus be obvious that as the piston 41 moves upward one stretch of the cable will be retracted and the other stretch of the cable paid out, thus causing the carriage 28 to be retracted from within the leer, that is the position shown in Figure 1 to the position shown in Figure 5, and that upon a reverse movement of the piston, that is a downward movement from the position shown in Figure 5, the carriage will be drawn out to the end of the beam or into the position shown in Figure 1.

The beam 25 is additionally supported by the truss rod 49, which rod is operatively connected to a bracket 50 mounted upon the beam midway its ends and the other end of the rod passes through the swiveled member 19, both ends of the rod being provided with nuts 51 whereby the tension on the rod may be taken up and thus the beam may be slightly raised or slightly lowered with reference to a horizontal plane.

Depending from the carriage 28 is the cylinder 31, as previously explained, and operating within this cylinder is a piston rod connected to a piston 52 having three lands defining two annular channels 53 and 54. The piston 52 extends out through the lower cylinder head 55 and has its lower end T-shaped, as at 56, and pivoted to the ends of this T-shaped portion are the links 57, which in turn are pivoted to the cross links 58 of a bottle clamp. This bottle clamp consists of two jaws 59 angular in cross section, as shown in Figure 12, the lower flanges of these jaws being cut away at 60 so as to be adapted to embrace the necks of the bottles, as shown in Figure 9, when the jaws are closed. The jaws 58 are pivoted upon a pivot pin 61 which passes through oppositely disposed slots 62 formed in side plates 63 which are attached to and depending from the lower head 55 of the cylinder. The links 57 are formed with turnbuckles 64 in their length by which the links may be reduced or increased in length.

It will be obvious now that when the piston in cylinder 31 is fully lowered, as shown in Fig. 10, that the jaws 59 will be opened and that when the piston is raised to the position shown in Figure 9 the jaws will be closed. This motion of the piston is secured by admitting compressed air either beneath the piston or above the piston through the ports 65 and 66 respectively. The cylinder 31 is also formed intermediate the ports 65 and 66 with a port 67 and on the opposite side of the cylinder above the port 67 with a port 68 and below the port 68 with a port 69.

Mounted upon the bracket 14 is the timer 15, as previously stated. This timer consists of a drum-like housing within which is disposed, as shown in Figure 19, a cylindrical valve 70 which is mounted upon a shaft 71 for rotation therewith, this shaft being shown as driven by a sprocket wheel 72, from which a sprocket chain 73 leads to any suitable motor. This shaft is driven at a constant speed. The valve 70 is formed with a pair of circumferentially extending ducts 74 and 75, as shown most clearly in Figures 15 to 18. These ducts are laterally spaced from each other and the ends of the ports are circumferentially spaced from each other, as seen in Figures 15 to 18.

Entering the cylinder 15 at one point in its diameter are the inlet pipes 76 which are adapted to register with the ducts 74, and extending from the cylinder 15 in line with the ducts 74 but beyond the pipe 76 is a pipe 77 which leads to the port 65, as shown in Figure 1. A pipe 76 may open into a port 78 that extends entirely across the cylinder so as to discharge either into the ducts 74 or the ducts 75. Aligning with the duct 75 is another outlet pipe 79 which communicates with the upper end of the cylinder 31 through the ports 66. The cylinder is also formed, as shown in Figures 15 and 19, with a pair of exhaust ports 80 and 81 communicating with the atmosphere, the port 80 being in the same plane as the duct 74, while the port 81 is in the same plane as the duct 75. When the valve 70 is in the position shown in Figure 15, air will enter from the pipe 76 which leads from any suitable air compressing device and passes into the ducts 74 and thence out through the pipe 77 to the lower end of the cylinder 31, and entering the cylinder through the port 65 will act to lift the piston in the cylinder to the position shown in Figure 9. This will continue so long as the duct 74 establishes communication between the pipes 76 and 77. When the duct 74, however, has reached the position shown in Figure 16, the duct 74 will establish communication between the pipe 77 and the exhaust port 80 and air which may be in the lower end of the cylinder 31 will be relieved through the port 80. As soon as the port 75 reaches the pipe 79, as shown in Figure 17, compressed air will pass into the pipe 79 and thus through ports 66 into the upper end of the cylinder 31, causing the descent of the piston. This will continue until the duct 75 has reached the position where it will establish communication between the pipe 79 and the exhaust 81, when the air in the upper portion of the piston will be discharged. Therefore, it will be seen that air is alternately admitted below and above the piston in cylinder 31 and that, therefore, the bottle gripping jaws will be alternately raised and lowered.

The raising or lowering of the piston in cylinder 31 controls the admission of air to the cylinder 40. The cylinder 40 has an air inlet port 82 at its upper end and a port 83 at its lower end (see Figure 5). The port 82 communicates by a pipe 84 with port 69, while the port 83 communicates by a pipe 85 with the port 68 in cylinder 31. The cylinder 31 is formed diametrically opposite to the port 68 but above this port with an exhaust port 86 and this cylinder is formed diametrically opposite the port 69 but below this port with an exhaust port 87. When the piston is raised to the position shown in Figure 9, the pipe 85 communicates with the space 53, which in turn communicates with the exhaust port 86 so that air is exhausted or relieved from the lower end of the cylinder 40, while the pipe 84 communicates with the space 54 (see Figure 9), which space is in communication with the port 67, this port being connected to a pipe 88 which leads to the main air supply and receives air therefrom.

Thus it will be obvious that with the piston valve in the position shown in Figure 9, air will have entered beneath the piston, raising it, the exhaust port 87 will be blanked or closed, the pipe 84 will be receiving air which will pass into the upper end of the cylinder 40, causing a depression of the piston to the position shown in Figure 1 and the consequent projection of the carrier 28 into the leer, while the pipe 85 which is connected to the lower end of the cylinder 40 will be connected to the exhaust port 86. At this time the port 66 will be connected by pipe 79 to an exhaust port. Upon a further movement of the timer, however, the pipe 79 will be connected to the air, while the pipe 77 will be connected to the exhaust and thus the piston within cylinder 31 will be depressed to the position shown in Figure 10, which will cause the pipe 84 to be connected to the exhaust, the exhaust port 86 be blanked, and the pipe 85 connected to the air inlet pipe 88 so that air will pass through pipe 85 to the lower end of the cylinder 40, raising the piston 41 therein and causing the retraction of the carriage 28 from its projected position to its receiving position.

The operation of the parts so far described is as follows: In Figure 9 the piston within cylinder 31 has been raised so that the jaws 59 grip the necks of the bottles. The piston, however, has not been raised sufficiently to carry the pin 51 to the upper end of the slot 52 and as a consequence the bottles have not yet been lifted from the buck C. The further upward movement of the piston will lift the bottles from the buck, as shown in Figure 9. As soon as this has occurred, air is admitted to the upper end of the cylinder 40, causing the depression of the piston 41. This acting through the cable 37 causes the carriage to move outward on the beam 25 and into the leer A. When the carriage has moved to its full extent into the leer or into the position shown in Figure 1, the timer valve has so shifted that the direction of air is reversed within the cylinder 31 and the piston therein is lowered, as shown in Figure 10, and the jaws are opened. As soon as this occurs, air is admitted to the upper end of the cylinder 40, causing the ascent of the piston 41, which will retract the carrier, the cylinder 31 and the jaws.

It will be noted that at this time the piston within the cylinder 31 does not rise but that the jaws are retracted in the same plane that they were in when they lowered the bottles onto the conveyor B and opened. The jaws move rearward so as to be disposed on each side of the necks of the bottles resting on the buck C and only after the jaws are in position on each side of the necks of these bottles does the timer act to lift the piston within the cylinder 31 to close the jaws and then lift the bottles to again carry the new row of bottles into the leer. It will thus be seen that the bottle gripping jaws first grip the bottles on the buck, then lift them and then carry them into the leer, then lower them onto the conveyor and open and return to a position engaging on each side of the bottles on the buck and that this operation is accomplished by the admission of air above and below the piston in cylinder 31 and by the admission of air, controlled by this piston in cylinder 31, through cylinder 40 above and below the piston 41.

For the purpose of disposing the bottles in rows and laterally moving the beam 25 so as to dispose the bottles in successive rows upon the conveyor B, I provide a spacing bar 89 which is mounted upon a shaft 90, in turn carried by a bracket 91 at the mouth of the leer and adjacent one side so that this spacing bar 89 may be turned into a position parallel to the side wall of the leer, as illustrated in Figure 2, or turned into a position at an angle thereto, as illustrated in Figure 6. This spacing bar 89, as illustrated in Figure 5, is disposed at the height of the cylinder 33. The shaft 90 extends downward to a point approximately in line with the upper face of the buck C, though any other position which will not interfere with the outward movement of the gripping jaws from the leer may be used, and the lower end of this shaft is mounted upon a bracket 92, and mounted upon the shaft 90 is an arm 93 which is connected by a link 94 to a bell crank lever 95, the arms of which are longitudinally slotted, as at 96. This bell crank lever is mounted upon a bracket 97 and that arm of the bell crank lever remote from the link 94 is slidingly and pivotally connected to a longitudinally shiftable rod 98 passing through a guide 99 of any suitable character and shown as mounted upon a pedestal 100. Rollers 98$^a$ are mounted on the end of the rack bar 98 to engage in the slot 96 of arm 95.

The rod 98 at its rear end is toothed at 101 (see Figure 13), the rack 101 operates upon a gear wheel 102 mounted upon a shaft 103 supported in a bracket 104, and this shaft carries at one end a ratchet wheel 105, and wrapped around the opposite end of the shaft is a cable 106 which is connected to a weight 107. This weight acts to urge the ratchet wheel 105 in a counter-clockwise direction. Operating in connection with the ratchet wheel is a lever 108 pivoted intermediate its ends on a projection from the bracket or support 109 and this lever at its upper end has pivoted to it a longitudinally extending pawl 110 which engages with the teeth of the ratchet so that when the lever is reciprocated in one direction the ratchet will be turned in a clockwise direction. The pawl is held in engagement with the ratchet by means of a spring 111. The opposite end of the lever is slotted and a pin 112 connects the lever with a piston rod 113 which enters a cylinder 114 wherein there is disposed a piston 115. The cylinder 114 has an air inlet port 116 at one end and an air inlet port 117 at the opposite end. A stop screw 118 limits the inward movement of the piston and therefore limits the retraction of the pawl 110, or rather limits the stroke of the pawl 110 by limiting the retractive movement of the pawl.

Also engaging with the ratchet 105 and preventing any rearward movement of the ratchet is a pawl 119 which carries a head 120 operating within a casing 121, the pawl operating through a slot in the bottom 122 of the casing, and a spring 123 within the casing bears upon this head 120 and forces the pawl downward. This will prevent any reverse movement of the ratchet wheel in a counter-clockwise direction but will permit movement of the ratchet wheel in a clockwise direction. This casing 121 is mounted upon a piston rod 124 which extends into a cylinder 125, this piston rod 124 carrying a piston 126 operating within the cylinder 125, the cylinder being mounted upon a bracket 127 extending from the bracket 109. Rotation of the piston rod and consequent rotation or oscillation of the casing 121 is prevented by an eye 128 carried upon the piston rod and with which a depending finger 129 engages, this finger being mounted upon the lower head of the cylinder 125. The cylinder 125 is provided with the oppositely disposed inlet ports connected to pipes 130 and 131. The outer end of the pawl 110 passes through an eye 132 mounted upon the piston rod of a piston 133 disposed within the cylinder 134. When this piston 133 is depressed, it will lift the pawl 110 from its engagement with the ratchet wheel 105 and when the piston is raised it will permit the spring 111 to carry the pawl into engagement with the ratchet wheel 105. This cylinder 134 is connected at one end to a pipe 135, to which the pipe 131 is connected, while at its opposite end the cylinder is connected to a pipe 136, to which the pipe 130 is connected, all as illustrated in Figure 13. The rack 101 is held in engagement with the gear wheel 102 by means of a roller 137 whose shank extends through a suitable support and which shank is adjustable by means of nuts so as to cause the roller to hold the rack bar 98 in engagement with the gear wheel 102.

It will be noted from Figure 1 that the air inlet port 116 is connected by a pipe 138 to the pipe 85 and that the air inlet port 117 is connected by a pipe 139 to the pipe 84. Therefore, it will be seen that when air passes from pipe 85 into the lower end of the cylinder 40 to lift the piston 41 and retract the carrier 28 that air also at the same time will pass into the port 116 and force the piston 115 rearward, thus retracting the pawl 110, and that on the contrary when the air passes through the pipe 84 into the upper end of the cylinder 40 to depress the piston 41 and thus cause a projection of the carrier 28 into the leer that air will also pass from pipe 84 into pipe 139 and through this pipe into the rear end of the cylinder 114, causing the projection of the piston 115 on its working stroke and the consequent rotation of the ratchet wheel 105 one step, which will cause the movement of the guide bar 89 or spacing bar one step forward, that is toward the middle of the leer. The beam 25 is shifted step by step from one side of the leer to the other from the position shown in Figure 2 to that shown in Figure 6 by means of the guide bar or spacing bar 89, the cylinder 31 being provided to this end with an outwardly projecting bracket 140 (see Figure 9) carrying a roller 141 at its extremity which bears against the vertical flange of the spacing bar or guide bar 89. Therefore as the guide bar swings over it will guide the carrier to the proper position to deposit a row of bottles in advance of or to one side of the row previously deposited. When the beam has moved transversely of the leer its full stroke, that is from the position shown in Figure 2 to the position shown in Figure 6, means is provided for returning the guide bar 89 to its original position and for automatically ringing a signal bell to indicate to the operators who are removing the ware from the discharge end of the conveyor B that the batch of ware on the conveyor has been completed.

To this end, I mount upon the side wall of the leer a push button of any suitable or usual character, designated generally 142, and connected by the wires 143 to an ordinary bell signal (not shown) and to a source of current. The beam 25 carries an outwardly projecting abutment 144 which engages this push button. Therefore, when the beam swings over to the position shown in Figure 6 and the last row of bottles has been deposited upon the conveyor, the push button 142 will be depressed, thus causing the signal to be sounded and indicating to the operators at the discharge end of the conveyor that power should be connected to the conveyor B to cause it to move forward a distance sufficient to discharge one batch of bottles and carry the newly laid batch of bottles or other ware into the leer.

In order to automatically return the spacing bar or guide bar 89 to its initial position, I mount upon the same side of the leer as the push button 142 the cylinder 145, shown in detail in Figure 3 and in Figure 7. Disposed within the cylinder is a piston valve, designated generally 146, this piston valve having at one end the outwardly projecting pin or stud 147 with which an abutment 148 on the beam 25 is adapted to engage to force the valve inward. The opposite end of the cylinder 145 is connected to the pipe 136, which pipe, as before described, connects by means of the pipe 130 to the upper end of the cylinder 125 and also connects with the lower end of the cylinder 134. The middle of the cylinder is connected by a port 149 to the pipe 135 which leads from the upper end of the cylinder 134 and which connects to the lower end of the cylinder 125. Opposite the port 149 there is provided an exhaust port 150 and a main air inlet port 151 which is connected to the source of compressed air (not shown). As illustrated in Figures 3 and 7, the air inlet pipe 151 is disposed on a level above the port 149, while the exhaust pipe 150 is disposed on a level below the port 149. Thus when the piston 146 is down, as shown in Figure 3, the pipe 135 is connected to the exhaust port 150, while when the piston is up, as shown in Figure 7, the pipe 135 is connected to a source of compressed air.

Opposed to the cylinder 145 is a cylinder 152 illustrated in Figures 2 and 6 as mounted upon the opposite wall of the leer. This cylinder is illustrated in detail in Figures 4 and 8. This cylinder is formed substantially like cylinder 145. It has therein a piston valve 153 having a pin 154 projecting out of the end of the cylinder and adapted to be engaged by an abutment 155 carried upon the beam 25 so that when this beam 25 swings to the position shown in Figure 2 this abutment will strike the pin 154 and force this pin and the valve 153 inward. The cylinder 152 at the end opposite the pin 154 has a connection with the pipe 135. The middle of the cylinder is connected to pipe 136. On the opposite side of the cylinder there is an exhaust port 156 located on a level above the entrance of pipe 136 and there is a main air inlet port 157 which is disposed on a level below the entrance to pipe 136.

It will be seen that when the beam 25 is in the position shown in Figure 2, that is in a position to deposit the first row of bottles or other ware upon the conveyor B, the valve 153 will be forced to the position shown in Figure 4 by the engagement of the abutment 155 with the pin 154. Under these circumstances, main air, that is air under compression, will pass from the source of supply through the port 157 into the space between the heads of the piston 153 and will thence pass into the pipe 136, forcing the piston 146 outward into the position shown in Figure 3. The air passing through the pipe 136 will also pass into the cylinder 134, forcing the piston 133 upward, and will pass through the pipe 130 into the upper end of the cylinder 125, forcing the piston 116 downward and the pawl 119 into full engagement with the ratchet wheel 105. Now as the piston 115 reciprocates under the action of the air passing alternately through the ports 116 and 117, the ratchet wheel 105 and the shaft 103 connected thereto will be given a step by step movement, gradually winding up the weight 107. This will shift the rack bar 98 and gradually shift the guide or spacer bar 89 over from the position shown in Figure 1 to the position shown in Figure 6 and, of course, causing the shifting of the beam 25 therewith. Eventually the abutment 148 will strike the pin 147, shifting the valve 146 from the position shown in Figure 3 to the position shown in Figure 7 and connecting the main air port 157 with the pipe 135 and cutting off the exhaust port 150. The compressed air in pipe 135 will now pass to the cylinder 152, the pressure of air will force the piston 153 outward or to the position shown in Figure 8 so that the pipe 136 will be connected to the exhaust port 156. Thus the two valves 157 and 183 are alternately shifted to a projected and retracted position.

The operation of this mechanism is as follows: Assuming that the mechanism is in the position shown in Figure 5 and that the carrier 28 is fully retracted, that the piston 53 is lowered and the jaws 59 are disposed on each side of a batch of bottles supported upon the conveyor C, at this time the timer valve 70 is in the position shown in Figure 17 and air is passing from the supply pipe 76 into the pipe 79 and by the pipe 79 into the upper end of the cylinder 31, holding the piston 52 downward in the position shown in Figure 10. The pipe 77 is connected by the duct 75 to the exhaust 80. As shown in Figure 10, air from the source of compressed air enters through pipe 88 and passes to pipe 85 and from pipe 85 is carried into the lower end of the cylinder 40 so that the piston 41 is held raised, the raising of this piston having caused the retraction of the carrier to the position shown in Figure 5. It is assumed that the first row of bottles has not been deposited upon the conveyor B and that the guide bar or spacer bar 89 is in the position shown in Figure 2. As the timer revolves in a clockwise direction in the position shown in Figure 15, the air pipe 76 is operatively connected to the pipe 77. This causes the air to pass along the pipe 77 to the lower end of the cylinder 33. At the same time the pipe 79 will be connected to the exhaust port. Thus air will pass through the pipe 77 to the lower end of the cylinder 33, lifting the piston 52. As the piston moves upward it will first close the jaws 59 and then the piston moves straight upward until the pin 61 strikes the upper end of the slot 62. When this has occurred the piston will be in the position shown in Figure 9 and the row of bottles or other ware will be lifted clear from the surface of the buck. There will now be pressure through the pipe 77 beneath the piston holding the piston up. The pipe 85 which is connected to the lower end of the cylinder 40 will now be connected to the exhaust port 86 so as to permit the outward passage of air from the upper portion of the cylinder 40. The pipe 84 which leads to the upper end of the cylinder 40 will now be connected to the air supply pipe 88 through the piston valve 52 so that the piston 41 will be forced downward from the position shown in Figure 5 to the position shown in Figure 1. This will act to shift the carrier 28 into the leer. As the carrier moves outward, the roller on the end of bracket 140 will strike the edge of the spacer bar 89 and follow inward until the carriage has been fully projected into the leer. As soon as this occurs the timer reverses the movement of the air within the cylinder 31 and air is now delivered through pipe 79 into the upper portion of the cylinder 31 and the piston 62 is lowered, which deposits the bottles upon the conveyor B. As soon as the jaws are opened the air from the air pipe 88 passes through the piston valve 52 to pipe 85 and thence to the lower end of cylinder 40, beneath the piston 41, lifting the piston and retracting the carrier and the bottle gripping jaws.

It is to be noted at this point that the jaws are not lifted upon this retractive movement but are simply opened. The carriage is retracted and carries the jaws into position on each side of the row of bottles on the buck. As the piston 41 moves upward to cause a retraction of the carrier 28 the air in pipe 85 passes down through pipe 138 to the forward end of the cylinder 114, causing the piston 115 to move toward the stop 118 and to retract the pawl 110 so that when the carrier has returned to its initial position, as shown in Figure 5, this pawl will be fully retracted. When the carrier moves outward, however, upon the downward movement of the piston 41, air will pass from the pipe 84 to pipe 139, and passing into the rear end of the cylinder 114 will force the pipe 115 forward, thus projecting the pawl 110, as shown in Figure 1, turning the ratchet wheel one step. This through the rack bar 98 will shift the spacer bar 89 one step into angular relation with the longitudinal axis of the leer and thus each time that the carriage moves inward the pawl 110 will be shifted to the position shown in Figure 5 and each time that the carriage moves outward the pawl will be shifted to the position shown in Figure 1 and in Figure 3 and the spacer 89 shifted correspondingly so that by the time the carriage reaches the point of engagement between the roller on bracket 155 and the bar 89, the bar will have been shifted and the roller on bracket 153 will shift along this bar, turning the beam 25 into angular relation. Then a new row of bottles will be deposited, the carrier will be again moved to secure a new row of bottles, and again move forward into the leer and deposit these bottles and while doing so it will cause the movement of the spacer bar and so on until a whole batch of bottles have been deposited on the conveyor, as shown in Figure 6.

When this occurs the beam 25 is swung to the position shown in Figure 6, which causes the sounding of a signal by means of the signal button 142 and at the same time forces inward on pin 147. This shifts the valve 146 to the position shown in Figure 7 and causes, by means heretofore described, the projection of the pin 154 of valve 153. The inward movement of the valve 146 causes main air from the port 157 to be discharged into pipe 135. This pipe 135, as will be seen from Figures 1, 2 and 13, leads to the upper end of the cylinder 134. This causes the depression of the piston 133 which immediately raises the operating pawl 110. At the same time air in pipe 135 passes through pipe 131 to the cylinder 125, lifting the piston 126, which raises the pawl 119 entirely out of its engagement with the ratchet wheel 105. The ratchet wheel is thus left entirely free and the weight 107 causes the rotation of the ratchet wheel in a counter-clockwise direction, which causes the retraction of the rack bar 98 and the consequent return of the spacer bar 89 to the position parallel to the adjacent wall of the leer. As soon as the beam 25 swings over to the position shown in Figure 2, the abutment 155 strikes the pin 154, forcing this valve 153 inward to the position shown in Figure 4. This causes main air to travel through the pipe 136 into the upper end of the cylinder 145, shifting the valve 146 into the position shown in Figure 3, permitting the exhaustion of air from the pipe 135. The main air traveling to the pipe 136 causes air to pass into the upper end of the cylinder 125, forcing down on the piston 126 and again holding the pawl 119 into operative position and this air also passes into the lower end of the cylinder 134, lifting the piston 133, which permits the pawl 110 to be drawn by means of the spring 111 into engagement with the ratchet and those mechanisms which act to shift the beam transversely across the conveyor again commence to operate.

Any means might be used for urging the beam 25 toward the cylinder 152, but I have found that the force exerted by the pull upon the cable 37, this cable being mounted, as will be seen, to one side of the beam will act to urge the beam toward the spacing bar 89.

It will be seen that a mechanism of this character which I have described is entirely automatic in its action, that it deposits the bottles or other glassware in rows upon the conveyor B and continues automatically depositing the glassware upon the conveyor in rows until a portion of the conveyor has been approximately filled with the ware. As soon as this occurs the signal is given, which warns those who are removing the glassware from the opposite end of the leer to shift the conveyor sufficiently so as to permit a new batch of glassware to be placed upon the conveyor and the operation of again filling a portion of the conveyor with glassware is repeated. The mechanism does away with a large amount of breakage and the glassware may be transported from the buck to the leer conveyor much more expeditiously than is possible where manual labor is used for this purpose.

It will be noted from Figures 15 to 18 that the two ducts 74 and 75 do not overlap at the ends but that there is a blank space 70ª between the ducts which causes a dwell after the carrier has moved into the leer, this dwell being sufficient for the bottles or other members supported by the jaws to come to a vertical depending position free from any swinging movement so that when the jaws are lowered the bottles will rest flat upon the conveyor belt B. The screw 118 (see Figure 13) is adjustable inward or outward to control the movement of the lever 108 and thereby secure proper adjustment of the parts which move the spacing bar 89. Of course, it will be obvious that the jaws 59 which are used for raising and carrying bottles will be modified to suit other kinds of glassware, and it will also be obvious that while I have designed this mechanism for the particular purpose of carrying glassware into a leer and depositing it therein, yet the mechanism might be used either in the form illustrated or in a modified form for the purpose of carrying other articles from one position to another and depositing the articles.

It will be noted by comparison with Figures 5 and 6, for instance, that the clamp 20 extends laterally from the column and then extends forward so that the beam 25 is not disposed immediately in line with the column but to one side thereof and that the cap 16 is, of course, formed to extend laterally so as to bring the swiveled member 19 immediately above the central axis of the arm 26ª which carries the beam. This brings the beam and the carrier into such position that they can take up the bottles or other ware on the buck C, or in other words the pivotal axis of the beam is immediately above the buck C.

It is likewise to be noted that the operating cables 37 are disposed to one side of the beam, as most clearly shown in Figure 9, and thus the pull on these operating cables as the carriage moves rearward tends to draw the beam toward the spacing or guiding bar 89 so that when this spacing bar is turned from the position shown in Figure 6 toward the position shown in Figure 2 by the mechanism which I have described, the beam will also swing laterally to the position shown in Figure 2. Any means may be used for this purpose and I do not wish to be limited to the means shown.

While I have illustrated the beam as being disposed approximately in line with one side of the leer, it is obvious that the beam might be disposed in the middle of the leer and still swing from one wall of the leer toward the other wall of the leer. The ball and socket joint composed of the members 21 and 22 not only allows the lateral swinging movement of the beam 25 but permits the vertical adjustment of the beam so that the bottles may be taken from a buck which is slightly above the surface of the conveyor in the leer and carry it downward into the leer, or may be taken from a buck which is slightly below the surface of the conveyor in the leer and carried upward into the leer. Thus the apparatus may be adjusted to suit circumstances of operation. Of course, where the plant is initially constructed with this carrying-in apparatus, the buck and the leer conveyor will be approximately on the same plane.

It will be seen that my mechanism embodies, generally speaking, means for shifting the ware carrier into the leer and retracting the carrier out of the leer, which means includes the cylinder 40, the piston valve 52 therein, and the timer 15, and coacting with this means for raising or lowering the jaws and simultaneously opening and closing them, which mechanism includes the timer and the piston valve 52 and the cylinder 31, and also that I have provided mechanism for spacing the rows of ware which includes the spacing bar 89, the cylinder 114 controlled by the timer and by the valve 52 in cylinder 31, the ratchet wheel and the piston in cylinder 114, which gives the ratchet wheel a step by step movement, and that I have provided mechanism for returning the spacer bar and, therefore, the beam to its initial position to start a new series of rows on the leer conveyor which includes the means for retracting the pawls 119 and 110 to disengage them from the ratchet wheel 105, the weight engaging the shaft of ratchet wheel 105, this mechanism being controlled by valves 146 and 153, in turn controlled by the beam.

I claim:—

1. The combination with a leer having an intermittently movable conveyor and an article support in front of the leer, of automatically operating means successively engaging a plurality of the articles on the support, carrying a plurality of articles into the leer, depositing the articles in the leer in a line, returning to its initial position, and again engaging a second lot of articles.

2. The combination with a leer having an intermittently movable conveyor and a ware support in front of the leer, of compressed air operated means successively acting to engage a plurality of articles of ware on the support and carry the articles into the leer and deposit them in a row on the conveyor, said means then automatically returning to its initial position and again engaging a second batch of articles.

3. The combination with a leer having an intermittently movable conveyor and an article support in front of the leer, of mechanism acting automatically to carry a plurality of articles from the support into the leer and deposit the plurality of articles in a line parallel to the direction of movement of the leer conveyor.

4. The combination with a leer having an intermittently movable conveyor and an article conveyor disposed in front of the leer, of means for automatically raising a plurality of articles from the second named conveyor and carrying said articles into the leer and depositing the plurality of articles upon the first named conveyor in a line parallel to the line of movement of the second named conveyor.

5. The combination with a leer having an intermittently movable conveyor and a ware support disposed in front of the leer, of means for automatically carrying the ware from said support into the leer and causing the deposit of the ware in longitudinally extending row on the leer conveyor from one side of the conveyor to the other until the conveyor is filled transversely, and successively depositing a second batch of ware in longitudinal rows until the conveyor is filled transversely.

6. The combination with a leer having an intermittently movable conveyor and a ware support disposed in front of the leer, of means for automatically carrying the ware from said support into the leer and causing the deposit of the ware in longitudinally extending rows on the leer conveyor from one side of the conveyor to the other until the conveyor is filled transversely, a signal automatically actuated when the last row has been deposited and the conveyor has been filled transversely whereby to notify the operator that the leer conveyor shall be moved longitudinally a predetermined distance, and means then operating to cause the deposit of a row of ware on the conveyor behind the first batch of ware and adjacent one side of the conveyor and the deposit of successive rows across the conveyor until the conveyor is again filled transversely.

7. A carrying-in mechanism of the character described including a longitudinally extending support, a carrier mounted on the support for reciprocation, ware-engaging jaws mounted on the carrier, compressed air operated means for shifting the carrier alternately in opposite directions on the support, compressed air operated means for automatically closing and raising the jaws when the carrier is retracted on the support and lowering and opening the jaws when the carrier is moved outward on the support, a source of compressed air, a chamber having ducts communicating with the carrier operating means and the jaw operating means, and a timing valve operating within said chamber and acting to control the passage of air to the said operating means.

8. A carrying-in mechanism of the character described including a longitudinally extending support, a carrier mounted on the support for reciprocation, ware-engaging jaws mounted on the carrier, compressed air operated means for shifting the carrier alternately in opposite directions on the support, compressed air operated means for automatically closing and raising the jaws when the carrier is retracted on the support and lowering and opening the jaws when the carrier is moved outward on the support, a source of compressed air, a chamber having ducts communicating with the carrier operating means and the jaw operating means, operating means disposed within the chamber and continuously operated and adapted in one position to cause the compressed air to lift the carrier and in another position to depress the carrier, ducts connecting the carrier to the means for longitudinally shifting the carrier, the carrier being connected to a source of compressed air, and a valve actuated by the reciprocation of the jaws and shiftable to connect the source of compressed air with one or the other of said last named ducts to thereby shift the carrier longitudinally in one direction along the support and then in the opposite direction.

9. A carrying-in mechanism of the character described including a supporting member, a beam extending therefrom and swingingly mounted for movement in a horizontal plane, a carrier mounted on the carrier, compressed air operated means for closing and raising the jaws when the carrier is retracted on the beam and lowering and opening the jaws when the carrier is moved outward on the beam, compressed air operated means for longitudinally reciprocating the carrier on the beam, compressed air operated means for shifting the beam laterally step by step upon each retraction of the carrier, compressed air operated means for automatically causing the beam to return to its initial position when the carrier has reached the end of its lateral swinging movement, and controlling means for the compressed air including a chamber and a constantly rotating valve therein.

10. A carrying-in mechanism of the character described including a supporting column, a beam mounted thereon, a carrier mounted on the beam for longitudinal movement therealong, ware engaging jaws mounted on the carrier for vertical movement, compressed air operated means for successively shifting the carrier outward on the beam, lowering and opening the jaws, and returning the carrier to its initial position, and single constantly operated means for controlling said compressed air operated means.

11. A carrying-in mechanism of the character described including a supporting column, a beam extending therefrom, a carrier mounted on the beam, a cylinder supported by the carrier, a piston movable vertically in the cylinder, ware engaging jaws pivotally supported by the cylinder, means connected to the jaws and to the piston whereby the jaws may be raised and then closed or lowered and then opened, means for automatically shifting the carrier along the beam in opposite directions, and means for admitting fluid pressure on one side or the other of the piston in said cylinder to thereby cause the raising or lowering and closing and opening of the jaws.

12. A carrying-in mechanism of the character described including a supporting column, a beam extending therefrom, a carrier mounted on the beam, a cylinder supported by the carrier, a piston movable vertically in the cylinder, ware engaging jaws pivotally supported by the cylinder, means connected to the jaws and to the piston whereby the jaws may be raised and then closed or lowered and then opened, and means for automatically shifting the carrier along the beam in opposite directions, said means including a constantly rotated valve alternately connecting opposite ends of the cylinder with a source of compressed air and the opposite end of the cylinder with an exhaust port.

13. A carrying-in mechanism of the character described including a supporting column, a beam extending therefrom, a carrier mounted on the beam for longitudinal movement therealong, a cylinder depending from the carrier, a piston operating therein, jaws mounted upon the cylinder for vertical movement relative thereto, means connected to the piston whereby the jaws may be raised or lowered and closed or opened by the raising or lowering of the piston, a second cylinder having a piston operating therein, means actuated by a movement of the piston in one direction for shifting the carrier outward on the beam and a movement of the piston in the other direction for retracting the carrier along the beam, constantly operated means for alternately admitting fluid under pressure to one side or the other of the first named piston, and means controlled by the first named piston for admitting fluid under pressure alternately to opposite ends of the second named cylinder.

14. A carrying-in mechanism including a supporting column, a beam extending therefrom, a carrier mounted on the beam for longitudinal movement thereon, ware engaging jaws mounted on the carrier, constantly operated means for alternately raising and opening and lowering and closing the jaws, means controlled by the raising of the jaws acting automatically to shift the carrier outward on the beam, and means controlled by the lowering of the jaws acting automatically to retract the carrier along the beam.

15. A carrying-in mechanism of the character described including a supporting column, a beam extending therefrom, a carrier mounted on the beam for longitudinal movement thereon in opposite directions, ware engaging jaws mounted on the carrier for vertical movement, fluid pressure operated means for successively closing and raising the jaws and lowering and opening the jaws, constantly operated means for controlling said compressed air to cause the alternate raising and lowering of the jaws and including a timer valve, and means controlled by the raising of the jaws causing the outward movement of the carrier upon the beam and by the lowering of the jaws causing the inward movement of the carrier upon the beam.

16. A carrying-in mechanism of the character described including a supporting column, a beam extending therefrom, a carrier mounted on the beam for longitudinal movement thereon in opposite directions, ware engaging jaws mounted on the carrier for vertical movement, fluid pressure operated means for successively closing and raising the jaws and lowering and opening the jaws, constantly operated means for controlling said compressed air to cause the alternate raising and lowering of the jaws and including a timer valve, means controlled by the raising of the jaws causing the outward movement of the carrier upon the beam and by the lowering of the jaws causing the inward movement of the carrier upon the beam, said means including a cylinder, a piston operating in the cylinder and when moved in one direction acting to retract the carrier and moving in the other direction to project the carrier, and a valve vertically moving with the jaws and alternately admitting fluid under pressure to opposite ends of the cylinder.

17. A carrying-in mechanism of the character described including a supporting column, a beam extending therefrom, a carrier mounted on the beam for longitudinal movement therealong, means for shifting the carrier longitudinally on the beam including a cylinder, a piston operating therein, a flexible connection extending along the beam, pulleys on the beam over which the flexible connection passes, the carrier being attached to said connection, the ends of the flexible connection being operatively engaged by the piston to thereby cause draft to be exerted on the flexible connection to draw the carrier in one direction when the piston moves in one direction and to shift the carrier in the opposite direction when the piston moves in the opposite direction.

18. A carrying-in mechanism of the character described including a supporting column, a beam extending therefrom, a carrier mounted on the beam for longitudinal movement therealong, means for shifting the carrier longitudinally on the beam including a cylinder, a piston operating therein, a flexible connection extending along the beam, pulleys on the beam over which the flexible connection passes, the carrier being attached to said connection, winding drums operatively connected to the piston to be rotated in opposite directions upon a movement of the piston, the ends of the flexible connection being connected to said winding drums whereby to cause the retraction of the carrier upon a movement of the piston in one direction and the projection of the carrier upon a movement of the piston in the other direction.

19. A carrying-in mechanism of the character described including a supporting column, a beam extending therefrom, a carrier mounted on the beam for longitudinal movement, a cylinder supported by the carrier, a piston operating within the cylinder and having two spaced circumferential channels, jaws mounted upon the cylinder and operatively connected to the piston, a second cylinder, a piston operating therein, means connected to the piston whereby the carrier may be shifted longitudinally in one direction or the other along the beam in correspondence with the movements of the piston, a source of air under pressure communicating with the middle of the first named cylinder, a pair of pipes leading from the first named cylinder on each side of the middle thereof and extending respectively to the upper and lower ends of the second named cylinder, a movement of the piston in one direction establishing communication between the source of air under pressure and one of said pipes and establishing communication with the other of said pipes and the exhaust port, the movement of the piston in the other direction establishing communication between the source of air under pressure and the last named pipe and establishing communication between the last named pipe and exhaust port whereby to cause the carrier operating piston to alternately reciprocate in opposite directions, means for shifting the carrier piston and the first named cylinder comprising a pair of pipes connected respectively to the upper and lower ends of the first named cylinder, and a constantly operating timer valve adapted to establish communication alternately between one of said pipes and the source of air and simultaneously establish communication between the other of said pipes and exhaust port.

20. The combination with a leer and a ware conveyor disposed within the leer, of a beam extending into the leer and mounted for movement transversely of the length of the leer, a ware carrier movable along the beam into or out of the leer and adapted to intermittently deposit a row of ware upon the conveyor, means for swinging the beam laterally in the leer a predetermined distance intermittently after each row of ware has been deposited to thereby dispose the ware in rows upon the conveyor, and means for returning the beam to its initial position after the last row of ware has been deposited.

21. The combination with a leer, of a beam extending into the leer and mounted for movement transversely thereof, a conveyor in the leer, a carrier mounted upon the beam for movement longitudinally thereof and having ware gripping members, means for retracting the carrier, means for causing the gripping members to engage a row of ware, means for then shifting the carrier along the beam into the leer and depositing a row of ware upon the conveyor in the leer, means for retracting the carrier, means for then shifting the carrier laterally one step to cause the carrier to deposit a successive row of ware upon its next inward movement, and means for causing the return of the carrier to its initial position when the last row of ware has been deposited.

22. The combination with a leer having a conveyor, of a beam projecting into the leer and movable transversely thereof, means mounted on the beam for engaging ware exterior to the leer, carrying the ware into the leer and depositing the ware and then returning to its initial position, means for causing the step by step movement of the beam transversely of the conveyor comprising a guide bar disposed within the leer, means actuated upon a return movement of the carrier out of the leer for causing a movement of the guide bar toward one side of the leer, and means for causing the return of said guide bar to its initial position and the return of the beam to its initial position when the last row of ware has been deposited upon the carrier.

23. The combination with a leer and a conveyor therein, of a beam mounted for swinging movement and having its end extending into the leer and over the conveyor, the pivotal axis of the beam being disposed in a plane adjacent one side of the leer, a guide bar pivotally mounted and extending into the leer, the pivot of the guide bar being disposed adjacent one side wall of the leer, a carrier mounted upon the beam, ware gripping members mounted upon the carrier, means for causing the alternate projection of the carrier into the leer and the operation of said members to deposit ware upon the conveyor and the retraction of the carrier and the operation of said members to engage a new lot of ware, means for causing the step by step lateral movement of the guide bar upon each retraction of the carrier, and means for automatically causing the return of the guide bar to its initial position parallel to one side wall of the leer and the return of the beam to its initial position when the last row of ware has been deposited upon the conveyor.

24. A carrying-in apparatus including a swingingly mounted beam, a carrier mounted upon the beam for longitudinal movement therealong, means for causing the alternate projection and retraction of the carrier along the beam, ware engaging means carried by the carrier and adapted to pick up ware when the carrier is retracted and to deposit ware when the carrier is projected, means for shifting one end of the beam laterally step by step upon each retraction of the carrier, and means for automatically causing an uninterrupted return movement of the beam to its initial position when the carrier has reached the end of its lateral swinging movement.

25. A carrying-in apparatus including a swingingly mounted beam, a carrier mounted upon the beam for longitudinal movement therealong, means for causing the alternate projection and retraction of the carrier along the beam, ware engaging means carried by the carrier and adapted to pick up ware when the carrier is retracted and to deposit ware when the carrier is projected, means for shifting one end of the beam laterally step by step upon each retraction of the carrier, means for causing the beam to return to its initial position when the carrier has reached the end of its lateral swinging movement comprising a lateral swinging guide bar with which the beam has operative engagement, and means for automatically swinging the guide bar one step upon each retraction of the carrier, said means acting to return the guide bar to its initial position when the beam has reached the end of its lateral swinging movement in one direction.

26. In a carrying-in mechanism, a column, a beam mounted on the column for lateral swinging movement, a carrier mounted upon the beam for longitudinal movement, vertically movable ware gripping members mounted upon the carrier, a laterally swinging guide bar with which the forward end of the beam has operative engagement, constantly operated fluid pressure controlling means for causing the alternate projection and retraction of the carrier and causing the depression of the ware gripping members when the carrier is fully projected and the lifting of the ware gripping members when the carrier is fully retracted, constantly operated fluid pressure controlled means for shifting said guide bar one step laterally to thereby shift the beam laterally upon each retraction of the carrier, means for urging the beam toward its initial position, and fluid pressure operated means for causing the return of the guide bar to its initial position when the beam has been shifted in one direction to the full extent of its movement.

27. The combination with a leer and a conveyor movable therein, of a column exterior to the mouth of the leer, a beam mounted upon the column for lateral swinging movement, means urging the beam to an initial position, a carrier mounted upon the beam for movement into or out of the leer, ware engaging jaws mounted upon the carrier for vertical movement, said jaws opening upon a downward movement and closing upon an upward movement, a guide bar extending into the leer and movable step by step toward one side of the leer and with which guide bar the beam has operative engagement whereby the beam is swung by the guide bar, compressed air operated means for raising or lowering the jaws, constantly operated means for controlling said compressed air operated means, compressed air operated means for shifting the carrier in one direction or the other along the beam, said means being controlled by the raising or lowering of the jaw operating means, compressed air operated means for giving a step by step movement to the guide bar in one direction and controlled by the means raising or lowering of the jaw operating means, compressed air operating means for giving a step by step movement to the guide bar in one direction and controlled by the means raising or lowering the jaws, and compressed air operated means acting automatically when the beam has been moved laterally to its full extent causing the retraction of the guide bar to its initial position.

28. The combination with a chamber having a conveyor therein, of means for depositing material in rows upon said conveyor comprising a swingingly mounted beam having one end extending into said chamber, a carrier movable along the beam, means for causing the projection of the carrier into said chamber and the retraction of the carrier out of said chamber, material engaging means mounted upon the carrier and adapted to be opened to deposit material and closed to receive material, means for shifting the carrier alternately in opposite directions and opening and closing said material engaging means, means for automatically shifting the beam one step in a direction toward one wall of the chamber comprising a shiftable guide bar with which the beam has operative engagement, means for automatically shifting the guide bar one step when the carrier has reached a predetermined position including a ratchet wheel, a reciprocatable pawl and a rotating pawl, means for urging the beam toward its initial position and against the guide bar, means for causing the automatic retraction of the guide bar to its initial position when the beam has been shifted to its full extent in one direction comprising a cylinder, a normally depressed piston therein operatively engaging the holding pawl, a second cylinder having a slotted member through which the end of the reciprocating pawl passes, a controlling cylinder disposed in the path of movement of the beam, a piston valve therein having a projecting pin with which the beam is adapted to have operative engagement when the beam is swung to the full extent of its movement in one direction to thereby shift the valve, said valve when shifted inward acting to connect the first named cylinder with a source of compressed air to thereby lift both pawls from engagement with the ratchet wheel, and means then acting automatically to return the ratchet wheel to an initial position and return the guide bar to its initial position.

29. In a carrying-in apparatus, a column, a supporting beam, a carrier mounted upon the beam for longitudinal movement, a cylinder supported by the carrier, a piston operating within the cylinder, jaws carried by the piston, the jaws being raised and closing upon an upward movement of the piston and being lowered and opened upon the downward movement of the piston, means for alternately shifting the carrier outward on the beam and retracting the carrier, means for alternately raising and lowering the piston comprising compressed air pipes extending into the cylinder above and below the piston, a valve casing, a constantly rotatable valve therein, the valve casing having an inlet port connected to a source of compressed air and an exhaust port and being connected to said pipes leading to the cylinder, the rotatable valve alternately connecting one of said pipes to the source of compressed air and the other of said pipes to the exhaust port.

30. In a carrying-in apparatus, a column, a supporting beam, a carrier mounted upon the beam for longitudinal movement, a cylinder supported by the carrier, a piston operating within the cylinder, jaws carried by the piston, the jaws being raised and closing upon an upward movement of the piston and being lowered and opened upon the downward movement of the piston, means for alternately shifting the carrier outward on the beam and retracting the carrier, means for alternately raising and lowering the piston comprising compressed air pipes extending into the cylinder above and below the piston, a valve casing, a constantly rotatable valve therein, the valve casing having an inlet port connected to a source of compressed air and an exhaust port and being connected to said pipes leading to the cylinder, the rotatable valve alternately connecting one of said pipes to the source of compressed air and the other of said pipes to the exhaust port, the means for shifting the carrier longitudinally along the beam including a cylinder, a piston operating therein, and means controlled by the first named piston for alternately admitting compressed air to opposite ends of the second named cylinder and alternately connecting that end of the second named cylinder remote from the end in which air is admitted to an exhaust port.

31. In a carrying-in apparatus, a column, a supporting beam, a carrier mounted upon the beam for longitudinal movement, a cylinder supported by the carrier, a piston operating within the cylinder, jaws carried by the piston, the jaws being raised and closing upon an upward movement of the piston and being lowered and opened upon the downward movement of the piston, means for alternately shifting the carrier outward on the beam and retracting the carrier, means for alternately raising and lowering the piston comprising compressed air pipes extending into the cylinder above and below the piston, a valve casing, a constantly rotatable valve therein, the valve casing having an inlet port connected to a source of compressed air and an exhaust port and being connected to said pipes leading to the cylinder, the rotatable valve alternately connecting one of said pipes to the source of compressed air and the other of said pipes to the exhaust port, the means for shifting the carrier longitudinally along the beam including a cylinder, a piston operating therein, the piston in the first named cylinder being formed to provide two circumferential chambers and the first named cylinder on one side, a medially disposed compressed air inlet port being formed with two exhaust ports on its opposite side having pipes leading to the upper and lower ends of the second named cylinder, the piston in the first named cylinder alternately connecting one of said pipes to the compressed air inlet port of the cylinder and the other pipe to one of the exhaust ports of the cylinder.

32. In a carrying-in apparatus, a column, a supporting beam, a carrier mounted upon the beam for longitudinal movement, a cylinder supported by the carrier, a piston operating within the cylinder, jaws carried by the piston, the jaws being raised and closing upon an upward movement of the piston and being lowered and opened upon the downward movement of the piston, means for alternately shifting the carrier outward on the beam and retracting the carrier, means for alternately raising and lowering the piston comprising compressed air pipes extending into the cylinder above and below the piston, a valve casing, a constantly rotatable valve therein, the valve casing having an inlet port connected to a source of compressed air and an exhaust port and being connected to said pipes leading to the cylinder, the rotatable valve alternately connecting one of said pipes to the source of compressed air and the other of said pipes to the exhaust port, the means for shifting the carrier longitudinally along the beam including a cylinder, a piston operating therein, the piston in the first named cylinder being formed to provide two circumferential chambers and the first named cylinder on one side, a medially disposed compressed air inlet port being formed with two exhaust ports on its opposite side having pipes leading to the upper and lower ends of the second named cylinder, the piston in the first named cylinder alternately connecting one of said pipes to the compressed air inlet port of the cylinder and the other pipe to one of the exhaust ports of the cylinder, means for shifting the beam step by step in one direction transversely of its length comprising a movable guide bar with which the beam has operative engagement, means for shifting said guide bar including a rack bar, a gear wheel engaging the rack bar, a ratchet wheel mounted in connection with the gear wheel, a reciprocatable pawl engaging the ratchet wheel, a yieldingly mounted holding pawl preventing reverse movement of the ratchet wheel, a cylinder, a piston operating therein and operatively engaged with the reciprocating pawl to cause its reciprocation, means for reciprocating the piston including pipes leading to the pipes delivering air to the upper and lower edge of the second named cylinder whereby when the piston in the second named cylinder is operated the piston of the last named cylinder shall be actuated, means acting to rotate the ratchet wheel and gear wheel against the action of said reciprocating and holding pawls, and means acting automatically when the guide bar and beam have been shifted to the full extent of their motion in one direction to release the holding pawls and detach the reciprocatable pawl from the ratchet wheel whereby to permit the ratchet and gear wheel to rotate in a reverse direction.

33. The combination with a leer having an intermittently movable conveyor and an article support in front of the leer, of means for automatically carrying a plurality of articles from the support into the leer and depositing the articles on the leer and conveyor including oppositely disposed jaws, the jaws having confronting recesses adapted to grip the article, means for shifting said jaws in a direction parallel to their length into the leer, opening the jaws to deposit a row of articles upon the leer in a direction parallel to the direction of movement of the leer conveyor, and means for then retracting the jaws in the direction of their length.

34. A carrying-in mechanism of the character described including a supporting structure, a beam extending therefrom, the beam and the supporting structure being provided one with a ball and the other with a socket receiving the ball whereby said beam may move laterally in a horizontal plane and vertically, a carrier mounted on the beam for longitudinal movement therealong, ware-engaging members mounted on the carrier, means for reciprocating the carrier on the beam and operating said ware-engaging members, and means for giving the beam a step by step motion in one direction and after a predetermined number of steps returning the beam to its initial position.

In testimony whereof I hereunto affix my signature.

EARL R. ODOM.